United States Patent
Zhang et al.

(10) Patent No.: US 8,621,018 B2
(45) Date of Patent: Dec. 31, 2013

(54) METHOD AND SERVER FOR INSTANT MESSAGING

(75) Inventors: Xiaochao Zhang, Shenzhen (CN); Jue Liao, Shenzhen (CN); Dingjia Chen, Shenzhen (CN); Bin Wei, Shenzhen (CN); Yanke Yao, Shenzhen (CN); Jianzhen Li, Shenzhen (CN); Bin Li, Shenzhen (CN); Qian Zhang, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 179 days.

(21) Appl. No.: 13/369,033

(22) Filed: Feb. 8, 2012

(65) Prior Publication Data

US 2012/0143974 A1 Jun. 7, 2012

Related U.S. Application Data

(63) Continuation of application No. PCT/CN2010/076882, filed on Sep. 14, 2010.

(30) Foreign Application Priority Data

Sep. 16, 2009 (CN) .......................... 2009 1 0093227

(51) Int. Cl.
*G06F 15/16* (2006.01)
(52) U.S. Cl.
USPC ............................ 709/206; 709/223; 709/224
(58) Field of Classification Search
USPC .......................................... 709/206, 223, 224
See application file for complete search history.

(56) References Cited

U.S. PATENT DOCUMENTS

| | | | |
|---|---|---|---|
| 2007/0282963 A1* | 12/2007 | Mo et al. ........................ | 709/207 |
| 2008/0092063 A1* | 4/2008 | Canfield et al. ............... | 715/753 |
| 2008/0307064 A1* | 12/2008 | George et al. ................. | 709/207 |
| 2009/0016510 A1* | 1/2009 | Becker et al. ............ | 379/142.15 |
| 2010/0131470 A1* | 5/2010 | Schmidt ....................... | 707/665 |

FOREIGN PATENT DOCUMENTS

| | | |
|---|---|---|
| CN | 101026592 A | 8/2007 |
| CN | 101094199 A | 12/2007 |
| CN | 101252548 A | 8/2008 |

OTHER PUBLICATIONS

English translation of the Written Opinion of the International Searching Authority regarding International Application No. PCT/CN2010/076882, dated Dec. 23, 2010.

International Search Report for International Patent Application No. PCT/CN2010/076882, dated Dec. 23, 2010, and English translation thereof.

* cited by examiner

*Primary Examiner* — Nicholas Taylor

(57) ABSTRACT

An Instant Messaging (IM) method and server are provided. The method includes: receiving instance login information sent by an IM client, wherein the instance login information at least includes login information of a user of the IM client and instance information of a terminal located by the IM client (101); authenticating identity of the user of the IM client, according to the login information in the instance login information (102); when the authenticating is passed, allocating an instance number for the IM client, according to the instance information in the instance login information, wherein the instance number is configured to uniquely identify the IM client (103). The server includes a receiving module (801), an authenticating module (802) and an allocating module (803). By adopting the method and server provided, multipoint login of one login account may be effectively achieved, and multiple aspects requirements of a user may be satisfied.

16 Claims, 5 Drawing Sheets

METHOD AND SERVER FOR INSTANT MESSAGING

CROSS-REFERENCE TO RELATED APPLICATIONS

This application is a continuation of International Application No. PCT/CN2010/076882, filed on Sep. 14, 2010. This application claims the benefit and priority of Chinese Patent Application No. 200910093227.4, filed Sep. 16, 2009. The entire disclosures of each of the above applications are incorporated herein by reference.

FIELD

The present disclosure relates to computer technologies, and more particularly, to a method and server for Instant Messaging (IM).

BACKGROUND

This section provides background information related to the present disclosure which is not necessarily prior art.

Instant Messaging (IM) has been generally accepted by most Internet users. Regardless whether for business or personal matters, a user may frequently adopt IM software to engage in interactions and communications with friends, colleagues, schoolmates, customers, and so on, to enable the IM software to become an indispensable tool in a user's daily life. Thus, users have ever-increasing requirements for some aspects of IM software, such as ease of use, stability, and security. With continuous enhancement of user requirements, a user is no longer limited to using IM software on a personal computer (PC) client. Instead, users similarly require that IM software operate on a mobile phone terminal, web, even a television terminal.

Present IM software includes an IM client which may operate on a mobile telephone, an IM client over the web, and an IM client which may be used on a television platform, so as to better meet daily IM requirements of multi-scenes and multi-terminals required by users.

Since an architecture implemented by conventional IM software may limit only one login instance at any moment for one login account. When the same account attempts to log in simultaneously with another terminal, the previous one will be forced to quit. For example, when a user has successfully logged in an IM client of a PC terminal, and then the user logs in an IM client of a mobile phone terminal with the same login account, the IM client of the PC terminal will automatically terminate the session and log out. That is, one login account may only log in to a single terminal client at one time. The simultaneous login of multi-type IM clients for a single account cannot be implemented. Thus, a message cannot be received by multiple points. The limitation results in an undesirable IM experience when switching among multiple scenes. Meanwhile, development of the IM software for multi-scene and multi-terminal use is also limited.

SUMMARY

This section provides a general summary of the disclosure, and is not a comprehensive disclosure of its full scope or all of its features.

To meet gradually diverse communication requirements of network users, so as to implement multipoint login of one login account, embodiments of the disclosure provide an Instant Messaging (IM) method and an IM server. The technical solution is as follows.

An IM method includes receiving instance login information sent by an IM client, in which the instance login information at least comprises login information of a user of the IM client and instance information of a terminal located by the IM client. Authenticating identity of the user of the IM client, according to the login information in the instance login information. When the authenticating is passed, allocating an instance number for the IM client, according to the instance information in the instance login information, in which the instance number is configured to uniquely identify the IM client.

A server also includes a receiving module, configured to receive instance login information sent by an IM client, in which the instance login information at least comprises login information of a user of the IM client and instance information of a terminal located by the IM client. An authenticating module to authenticate identity of the user of the IM client, according to the login information in the instance login information. An allocating module, configured to allocate an instance number for the IM client according to the instance information in the instance login information, when the authenticating performed by the authenticating module is passed, in which the instance number is configured to uniquely identify the IM client.

The advantages achieved by the technical solution provided by various embodiments are as follows.

When logging in with an IM client, the instance information of a terminal located by the IM client may be added to the login information of the user to form instance login information to be sent to the IM server. The IM server authenticates the user identity according to the login information. When the authentication is passed, the IM server allocates an instance number for the terminal located by the IM client, according to the instance information, and uniquely determines the IM client according to the user's login account and the terminal's instance number. Thus, a user may be enabled to log in an IM client simultaneously from a mobile phone, the web, or a PC, to meet user usage requirements of multiple aspects. The usage requirements for multiple scenes may be greatly facilitated. The IM client may be conveniently used at different locations to greatly facilitate the user experience and improve the ease of use of IM software.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

To make objectives, technical solutions and advantages of the invention more clear, detailed descriptions about implementation modes of the invention are further provided in the following accompanying with attached figures.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 1:
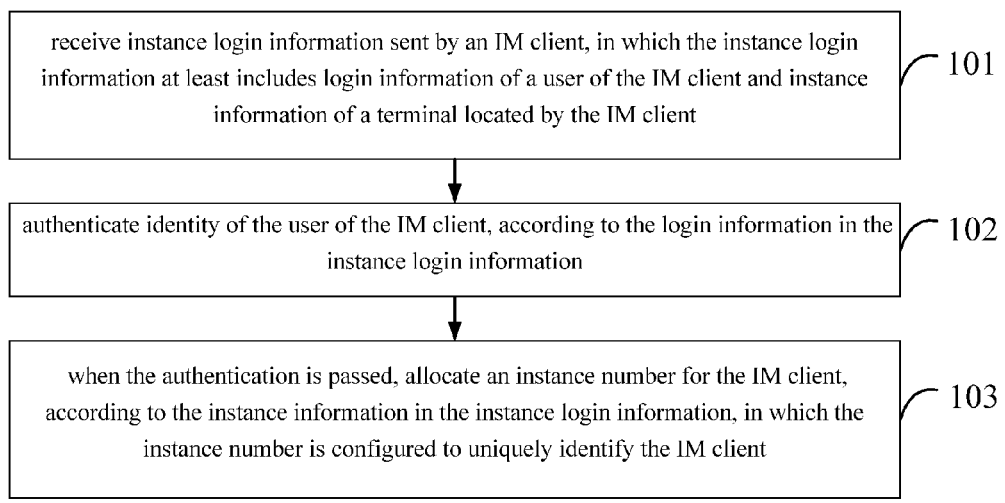
FIG. 1 is a flowchart illustrating an IM method in accordance with the first embodiment.

With reference to FIG. 1, an embodiment provides an IM method, which includes the following:

101: an IM server receives instance login information sent by an IM client. The instance login information at least includes login information of a user of the IM client and instance information of a terminal located by the IM client. It should be noted that, the IM client described in various embodiments is a generalized IM client. That is, browser, software and other, which may achieve the objective of IM, may also be referred to as IM client. The instance refers to when a user simultaneously logs in to multiple IM clients with a same login account via one or multiple terminal devices, each login client may be referred to as one instance. While, related information of each instance, such as Internet Protocol (IP) address, terminal type, login time, may form the instance information.

102: the IM server performs identity authentication for a user of the IM client, according to the login information included in the instance login information.

103: when the authentication is passed, one instance number may be allocated for the IM client, according to the instance information in the instance login information. The instance number is configured to uniquely identify the IM client.

In various embodiments, when an IM client is logging in, the instance information of a terminal located by the IM client may be added to the login information of the user to form the instance login information to be sent to the IM server. The IM server may authenticate user identity according to the login information. When the authentication is passed, the IM server may allocate an instance number for the IM client according to the instance information. The instance number may uniquely identify the IM client. Thus, a user may be enabled to simultaneously log in an IM client with a mobile phone, or with web mode, or simultaneously log in the IM client with a Personal Computer (PC) mode, to meet multi-aspect usage requirements of a user. Thus, multi-scene usage requirements of a user may be greatly facilitated, and an IM client may be used conveniently in different locations.

Figure 2:
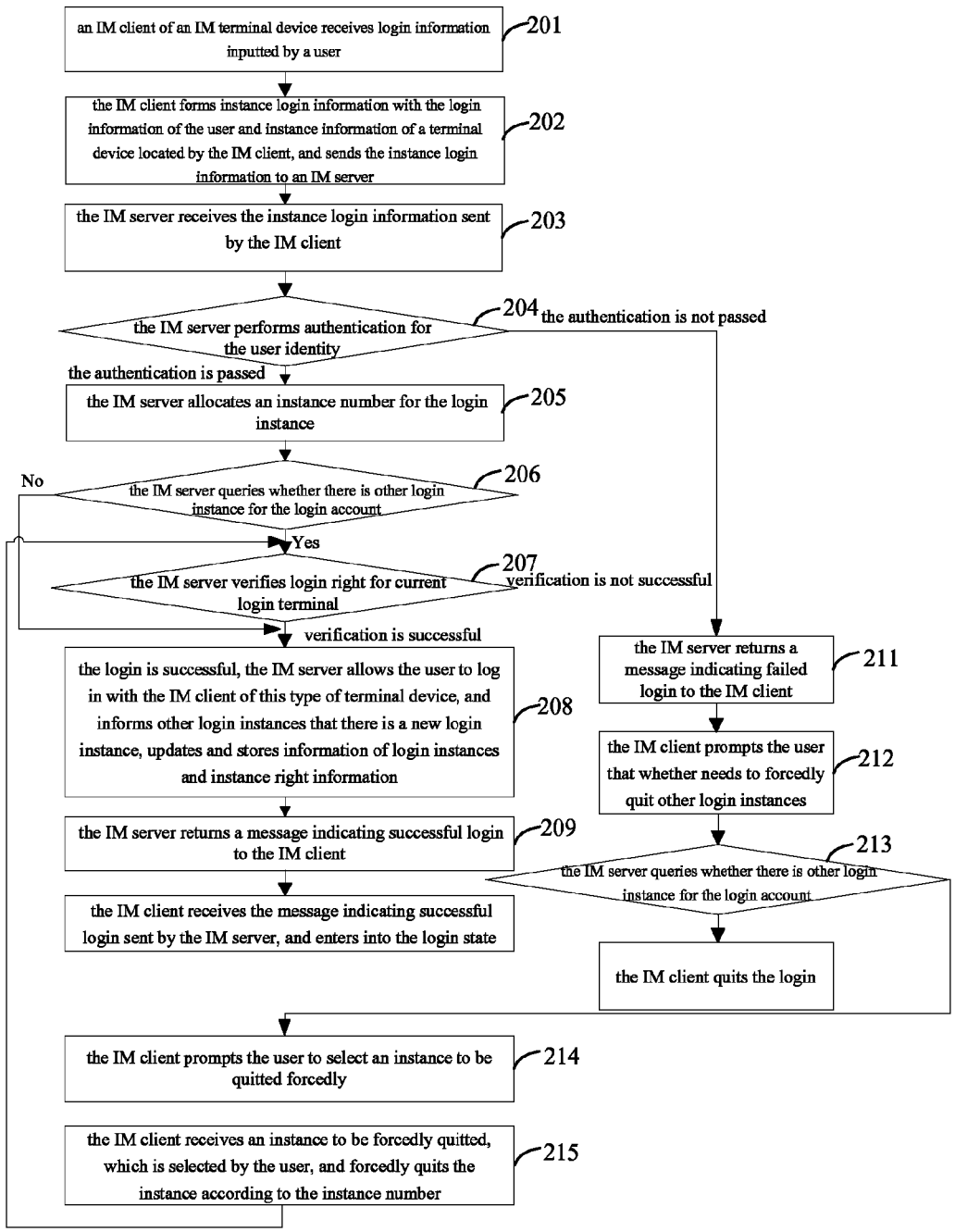
FIG. 2 is a flowchart illustrating an IM method in accordance with the second embodiment.

To facilitate a user utilizing the same login account to simultaneously log in an IM client of multiple kinds of terminal devices, an embodiment provides an IM method. An example is provided, in which an IM server is taken as an execution subject. The server provided by the embodiment stores instance information, which has been negotiated by the server and multiple kinds of IM terminal devices. With reference to FIG. 2, the method includes the following.

201: an IM client of an IM terminal device receives login information input by a user. The terminal device described in various embodiments may be multiple kinds of terminal devices, such as mobile phone, PC, television, and so on. Functions of IM client of each terminal device are basically the same, which may also be different from each other according to different types of terminal devices. In various embodiments, an example is given, in which login account and password input by a user are taken as login information.

202: the IM client forms instance login information with login information of the user and instance information of a terminal device located by the IM client, and sends the instance login information to the IM server. A method for forming the instance login information by the IM client includes, but is not limited to the following. The IM client uses a login protocol previously stipulated with the IM server (or, a specific login protocol), encodes the login information (such as login account, password, etc) and the instance information (such as terminal type, etc) to corresponding fields of a data packet. Alternatively, the IM client performs operations, such as encryptions, to instance information of a terminal device located by the IM client and the login information of the user, according to a key previously stipulated with the server.

In various embodiments, explanations are provided with an example, in which the IM client encodes the user's login information (login account and password), and instance information of a terminal device located by the IM client (terminal type), to corresponding fields of a data packet, according to a login protocol previously stipulated with the IM server. The specific format of the data packet may include the following: Start flag of the packet, account, password authentication information, terminal type, network address, client version, and other login information field, packet end flag. The IM client may send the instance login information to the IM server with multiple modes, such as cabled network, wireless network, Local Area Network (LAN), etc.

203: The IM server receives the instance login information sent by the IM client. Generally speaking, the instance login information may be sent in the form of cipher text. After receiving the instance login information in the form of cipher text, the IM server firstly needs to decode it. The decoding for the cipher text information may be executed utilizing a decoding algorithm previously stipulated between the IM server and the IM client, which are not repeated here. The decoded information includes the login information of the user of the IM client and instance information of the terminal device located by the IM client.

204: The IM server authenticates the user identity, according to the login information in the instance login information. When the authentication is passed, control proceeds to block 205. When the authentication is not passed, control proceeds to block 211.

The method for authenticating the user identity may include authentications for accuracy and validity of the user identity. Specifically speaking, authentication for accuracy of the user identity is to determine whether the login information of the user is correct. Authentication for the validity of the user identity is to determine whether the login information of the user is still within the validity period.

The specific authentication method may be as follows: The IM server queries login information previously stored therein (e.g., login account and corresponding password, etc), according to the login information decoded (e.g., login account and password) in block 203. When the login information decoded completely matches with a certain piece of login information previously stored in the IM server, and the login information is within the validity period, the authentication for the user identity is passed. When the decoded login information cannot completely match with any piece of login information previously stored in the IM server, and/or, the decoded login information is not within the validity period, the authentication for the user identity is not passed.

For example, suppose the login information previously stored in the IM server is shown in Table 1.

TABLE 1

| Sequence number | Login account | User name | password | nickname |
|---|---|---|---|---|
| 1 | 7895462 | Helen | 123456 | orange |
| 2 | 5679512 | Jessica | fri456 | Jessica |
| 3 | 12357664 | Mike | 123wed | Mike |

When the login information decoded by the IM server is "login account 5679512, password fri456", query the login information previously stored in Table 1. When the login information previously stored includes a record, the login account and password of which are respectively 5679512 and fri456, the authentication for user Jessica is passed.

When the login information decoded by the IM server is "login account 5679512, password 123456", query the login information previously stored in Table 1. It may be determined that there is no record, the login account and password of which are respectively 5679512 and 123456 in the login information previously stored. Thus, the authentication for the user identity is not passed.

205: the IM server allocates an instance number for the login instance. The instance number allocated by the IM server for the login instance is a combination of at least one of number, character and letter. The IM client may be uniquely determined with the login account and instance number. The instance number is completely transparent to the user. The IM server may store each allocated instance number. The stored records may be as shown in Table 2.

TABLE 2

| Login account | Terminal type of login instance | Login time | Login address | Allocated instance number |
|---|---|---|---|---|
| 7895462 | Mobile phone | 17:00 September 2 | 192.168.000.0 | 7895462-MP-A |
|  | computer | 15:05 September 2 | 192.168.102.2 | 7895462-PC-A |
|  | television | 19:53 September 2 | 192.102.1.158 | 7895462-TV-A |

206: the IM server queries whether there is other login instance for the login account, according to the login account in the login information. If yes, proceed to block 207. If no, proceed to block 208.

For example, when a user with the login account of 7895462 passes the identity authentication, the IM server allocates an instance number for the user. Take 7895462-MP-B as an example, the IM server queries whether there is other login instance for the login account in the stored instance number information, according to the login account 7895462, and obtains the query result as shown in Table 2. That is, there are three login instances for the user with login account of 7895462, which are respectively a mobile phone login instance with an instance number of 7895462-MP-A, a computer login instance with an instance number of 7895462-PC-A and a television login instance with an instance number of 7895462-TV-A.

207: the IM server verifies the login right for current login terminal. When the verification is successful, proceed to block 208. When the verification is not successful, proceed to block 211.

Method for verifying the login right for current login terminal executed by the IM server may be as follows.

(1) The IM server determines whether number of login instances has reached the top limit previously stipulated. When the number has reached the top limit, the verification is not passed. When the number has not reached the top limit, the verification will be further executed. The top limit described here may be set by a user according to actual conditions thereof. The set result may be stored in the IM server. Alternatively, the top limit here may be defined by the IM server according to parameters thereof, e.g., volume.

(2) The IM server may query an instance of right information previously stored, according to the instance information decoded. When the terminal device located by the IM client denoted by the instance right information is not limited, the verification is successful. When the terminal device located by the IM client denoted by the instance right information is limited, the verification is not successful.

For example, suppose the instance right information stored in the IM server is as shown in Table 3.

TABLE 3

| Login account | Terminal type | Number allowed to be used simultaneously | Login number | Total number allowed to be used simultaneously | Total login number |
|---|---|---|---|---|---|
| 7895462 | Mobile phone | 2 | 1 | 5 | 3 |
|  | computer | 2 | 1 |  |  |
|  | TV | 1 | 1 |  |  |
| 5679512 | Mobile phone | 1 | 1 | 3 | 2 |
|  | computer | 1 | 1 |  |  |
|  | TV | 1 | 0 |  |  |
| 12357664 | Mobile phone | 3 | 3 | 6 | 6 |
|  | computer | 2 | 2 |  |  |
|  | TV | 1 | 1 |  |  |

When identity authentication for a user is successful, the server may query the instance right information corresponding to the login account in the instance right information shown in Table 3, according to the login account of the user, and verifies right of the terminal device located by the IM client of the login account, according to the found instance right information corresponding to the login account. Take the following example to facilitate descriptions, in which identity authentication for a user with login account 7895462 is successful. Query the instance right information thereof according to the login account is as follows: The total number of terminal devices allowed to use the login account simultaneously is 5. Specifically, the number of mobile phones allowed to use the login account is 2. Meanwhile, the number of computer terminals allowed to use the login account simultaneously is 2, and the number of TV terminals allowed to use the login account is 1. Besides, regarding each instance logged in successfully, the server will update the record thereof. Thus, the IM server may store number of instances logged in successfully. When total number of terminal devices denoted by terminal type carried in the instance information is larger than the top limit of terminals allowed to be used simultaneously, or the total number of instances logged in successfully has reached the top limit, the IM server may refuse a terminal of this type to log in with the login account. When the total number of terminal devices denoted by terminal type carried in the instance information is smaller than the top limit of terminals allowed to be used simultaneously, meanwhile the number of instances logged in successfully is also smaller than the top limit thereof, the terminal device located by the IM client of the login account may log in, and may also pass the verification of the IM server.

The top limit of each kind of terminal device allows logging in simultaneously, and the top limit of total number of multiple kinds of terminal devices allows logging in with one login account simultaneously may be set by a user, or may be set by a server according to parameters thereof, such as carrying capability. The user may define the top limit with menu, option, etc, provided by the IM client for the user, which are not repeated here.

208: the login is successful, the IM server allows the user to log in with the IM client in the terminal device of this type, and informs other login instances that there is a new login instance, updates and stores the login instance information and instance right information. Update the login instance information may be as follows. The IM server may update the login instance information with counter, and so on. Take the instance information in Table 2 as an example, the updated login instance information may be as shown in Table 4.

TABLE 4

| Login account | Terminal type of login instance | Login time | Login address | Allocated instance number |
|---|---|---|---|---|
| 7895462 | Mobile phone | 17:00, September 2 | 192.168.000.0 | 7895462-MP-A |
|  | Mobile phone | 18:38, September 2 | 192.168.000.5 | 7895462-MP-B |
|  | Mobile computer | 15:05, September 2 | 192.168.102.2 | 7895462-PC-A |
|  | TV | 19:53, September 2 | 192.102.1.158 | 7895462-TV-A |

When the login account 7895462 has successfully logged in with a mobile phone, update the instance right information of login instances may be as follows. The IM server may add 1 to "login number" of mobile phone in the instance information of the login account 7895462, update the "login number" to obtain 2, add 1 to "total login number" and update to obtain 4. That is, the information in Table 3 may be updated as shown in Table 5.

TABLE 5

| Login account | Terminal type | Number allowed to be used simultaneously | Login number | Total number allowed to be used simultaneously | Total login number |
|---|---|---|---|---|---|
| 7895462 | Mobile phone | 2 | 2 | 5 | 4 |
|  | Computer | 2 | 1 |  |  |
|  | TV | 1 | 1 |  |  |

TABLE 5-continued

| Login account | Terminal type | Number allowed to be used simultaneously | Login number | Total number allowed to be used simultaneously | Total login number |
|---|---|---|---|---|---|
| 5679512 | Mobile phone | 1 | 1 | 3 | 2 |
|  | Computer | 1 | 1 |  |  |
|  | TV | 1 | 0 |  |  |
| 12357664 | Mobile phone | 3 | 3 | 6 | 6 |
|  | Computer | 2 | 2 |  |  |
|  | TV | 1 | 1 |  |  |

The IM server may use some formats, such as tips (prompt), pop-up dialog box, to inform other login instances that there is a new login instance, meanwhile, inform the new instance that there are other login instances. Alternatively, a user may obtain other login instances manually.

209: the IM server returns a message indicating successful login to the IM client. The message indicating successful login at least carries the instance number allocated for the IM client.

210: after receiving the message indicating successful login sent by the IM server, the IM client enters a state after login.

211: the IM server returns a message indicating failed login to the IM client.

It should be noted that when receiving the message indicating failed login returned by the IM server, there may be two processing approaches for the IM client. The first processing approach is to directly quit. The second processing approach is that the user selects to quit other instances with the IM client, and the IM client continuously logs in. Detailed descriptions for these two processing approaches are provided in the following.

212: after receiving the message indicating failed login returned by the IM server, the IM client prompts whether the user needs to force quit other login instances. The IM client may prompt the user with some formats, such as tips, pop-up dialog box, and wait for the input from the user.

213: the IM client receives the instruction signal input by the user, in which the instruction signal may be an instruction indicating to quit directly, or an instruction indicating to log in continuously. When the instruction signal input by the user is an instruction indicating to directly quit, the IM client quits the login. When the instruction signal input by the user is an instruction indicating to log in continuously, proceed to block 214.

214: the IM client prompts the user to select instances to be forced to quit.

The IM client may prompt the user to select instances to be forced to quit with some formats, such as list, option box and input box.

It should be noted that, the IM client may also prompt the user to select to maintain current login state of an instance, so as to achieve the objective of quitting an instance forcibly, which are not limited here.

215: after receiving an instance to force to quit (or an instance, current login state of which is to be maintained), which are selected by the user, the IM client may force quit the instance according to the instance number, and proceed to block 207 once again.

In the embodiment of the invention, the instance login information formed by the instance information and the login information may be sent to the IM server. The IM server may authenticate identity of user of the IM client, according to the login information previously stored. When the authentication is passed, the IM server may allocate an instance number for the IM client according to the instance information. The instance number may uniquely identify the IM client. Thus, a user may be enabled to log in an IM client simultaneously with mobile phone, web mode, or PC mode, to meet usage requirements of multiple aspects for a user, which may greatly facilitate the usage requirements under multiple scenes for a user. The IM client may be conveniently used at different locations. Convenient sense and favorability of a user when employing the IM client may be increased.

Figure 3:
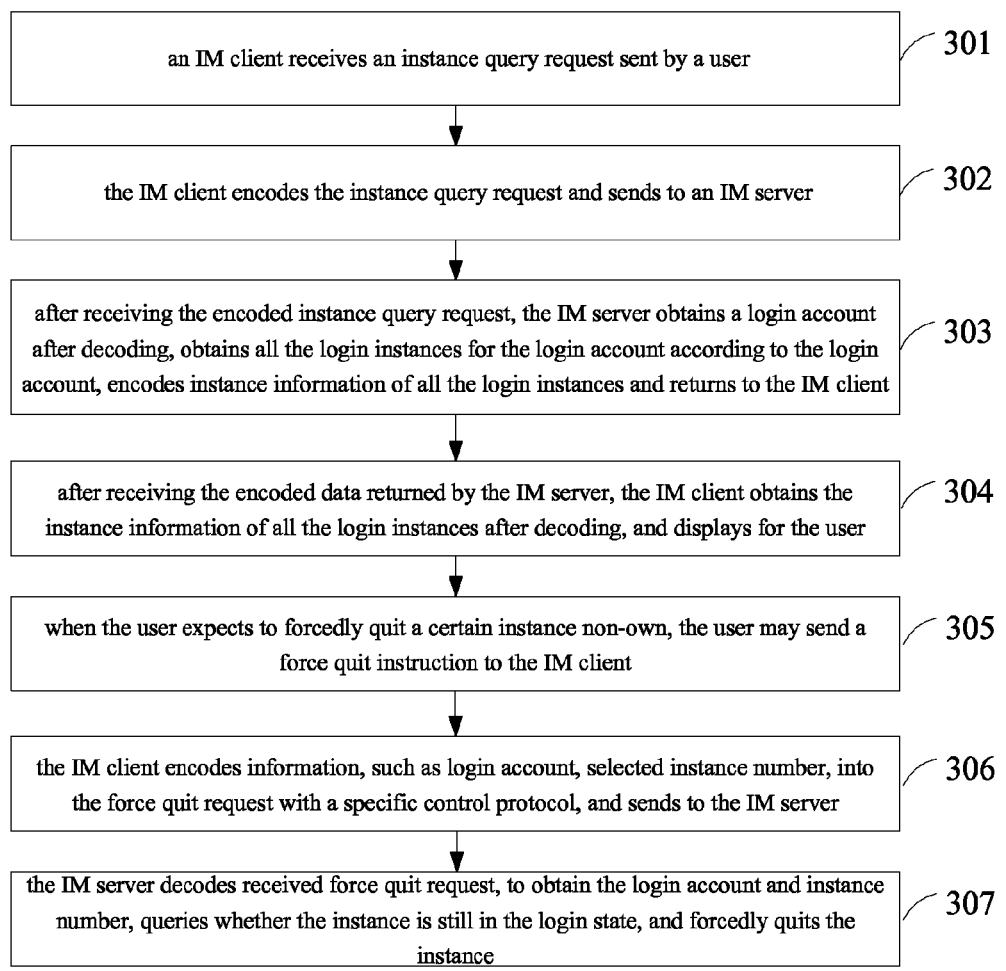
FIG. 3 is a flowchart illustrating an IM method in accordance with the third embodiment.

Various embodiments provide a method for processing IM messages. The method provided by the embodiment is established on the basis that, an IM client of a terminal device has successfully logged in an IM server with the method provided by the second embodiment. The method provided by the embodiment mainly focuses on interactive query and control among IM clients of terminal devices of different types, in which a same login account has logged in the IM clients of terminal devices of different types. With reference to FIG. 3, the method includes the following:

301: an IM client receives an instance query request. The instance query request is configured to request to query other login instances of the login account. It should be noted that, after the IM client logs in successfully, the IM server may provide the IM client with all the current login instances of the login account. Alternatively, the IM client may also actively obtain all the current login instances of the login account. In the embodiment, an example is provided, in which all the current login instances of the login account are actively obtained.

302: the IM client encodes the instance query request, and then sends the encoded instance query request to the IM server. The IM client may use a specific query protocol to encode information of the instance query request to a data packet, and send it to the IM server with the following modes, such as cabled network, wireless network or LAN. The information in the instance query request at least includes the login account of a user of the IM client.

303: after receiving the encoded instance query request, the IM server may obtain the login account after decoding, and may also obtain all the login instances of the login account, according to the login account. Then, the IM server may encode instance information of all the login instances and return to the IM client.

304: after receiving the encoded data returned by the IM server, the IM client may obtain instance information of all the login instances after decoding, and display for the user.

305: when the user would like to be forced to quit an instance, the user may send a force quit instruction to the IM client.

The force quit instruction may be sent out, when performing operations, such as select a certain instance and click the delete button, or select a certain instance and click the right button to choose force quit.

306: The IM client may use a specific control protocol, to encode information, such as the login account, selected instance number, to the force quit instruction, and send to the IM server.

307: the IM server may decode the received force quit request, to obtain the login account, instance number, so as to query whether the instance is still in the login state, and forced to quit the instance.

In various embodiments, different instance numbers may be used for uniquely identifying an instance logged in via different login terminals with the same login account. Thus, a user may be enabled to differentiate different instances with instance number, when the user would like to quit an instance, and to force quit a certain instance.

Various embodiments provide a method for processing IM messages. The method provided by the embodiment is established on the basis that, an IM client of a terminal device has successfully logged in an IM server with the method provided by the second embodiment. The method provided by the embodiment mainly describes how to determine which login instance is operated by current user.

Figure 4:
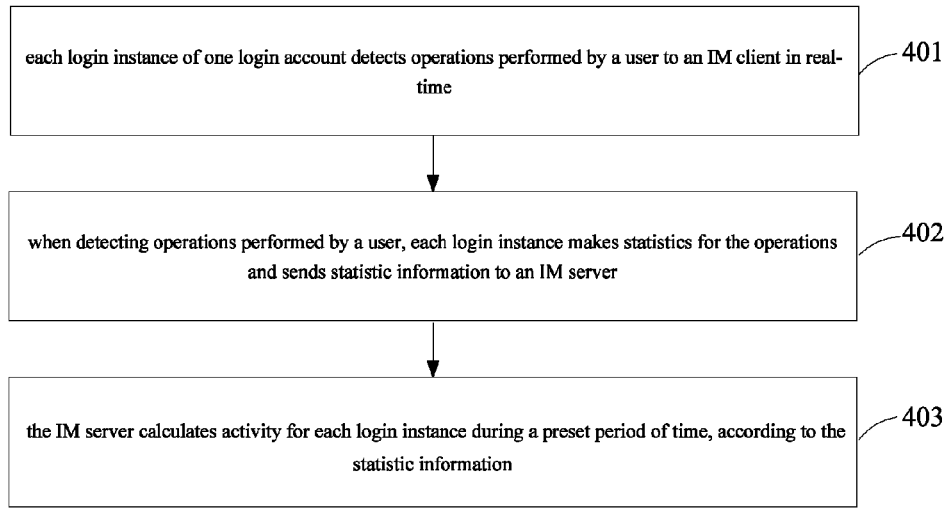
FIG. 4 is a flowchart illustrating an IM method in accordance with the fourth embodiment.

It should be noted that, terminal devices of different types logged in with the same login account, are not completely peer-to-peer. Since a user may only perform operations to one instance at the same time, to enable user's experience for IM software to appear more smooth and human, when one login account logs in with an IM client of terminal devices of different types, the IM client may be enabled to learn which login instance is operated by current user with the following method. The method may be referred to as a method for determining active point. With reference to FIG. 4, the method for determining active point includes the following:

401: each login instance of one login account detects operations performed by a user to the IM client in real time. The operations performed by a user to an IM client may be as follows: login manually, click button, edit text, use voice, use video, click panel, slide mouse within the panel scope.

402: when detecting operations performed by a user to each login instance, each login instance may make statistics for the operations, and report statistic information to the IM server by reporting user activity information. The statistic information at least includes operation type and operation time.

403: the IM server may calculate activity for each login instance in a preset period of time, according to the statistic information in the reported user activity information.

Due to the timeliness of IM communications, there are time requirements for activity of an instance actually. Only operations executed within a preset period of time may be taken into consideration when making statistics for activity. The operations without timeliness are not taken into consideration. The preset period of time may be to make statistics every 10 minutes. Thus, no statistics will be made for operations performed 10 minutes before, because there is no timeliness. Each operation type corresponds to score one kind of activity. The score may be set by a user, or may be set by an IM server in advance. The IM server may calculate total score of activity for each login instance, according to activity score corresponding to operation type. The instance with the highest total score is current activity point of the login account.

With reference to each login instance, the IM server may add an activity score corresponding to each operation type all together, to take the result as the total activity score. Alternatively, the activity score of each operation type may be respectively weighted and added, to take the result as the total activity score. The specific algorithm is not fixed, which may be adjusted according to effects and product strategy.

The method for calculating total activity score may be conveniently used in the following scenarios. Total activity score increases when active operations of a user increases. Total activity score reduces when active operations of a user reduce. Thus, the instance currently operated by the user may be effectively reflected.

For example, when a mouse slides within panel scope, the activity score is 25. When clicking a button, the activity score is 50. When sending a message, the activity score is 100. When there is no operation during 1 minute, the activity score is −20, and the like. For example, when there are two login instances 1 and 2 for login account A, total activity score of instance 1 currently is 10, total activity score of instance 2 currently is 90, thus instance 2 is current active point.

It should be noted that, in a preset period of time, when total activity score of each login instance for one login account is 0 (or equal), that is, each instance is not active in a preset period of time, and then the IM server may determine there is no active point currently. When there is no active point currently for one login account, the latest instance with activity may be tracked to and taken as the last active point.

In various embodiments, different activity scores may be allocated for different kinds of user operation, and total activity score of each login instance for one login account in a preset period of time may be calculated. The login instance currently used by the user may be determined in all the login instances, according to the total activity score thereof. The method is simple and practical, which may be used to quickly determine the login instance currently used by the user.

Figure 5:
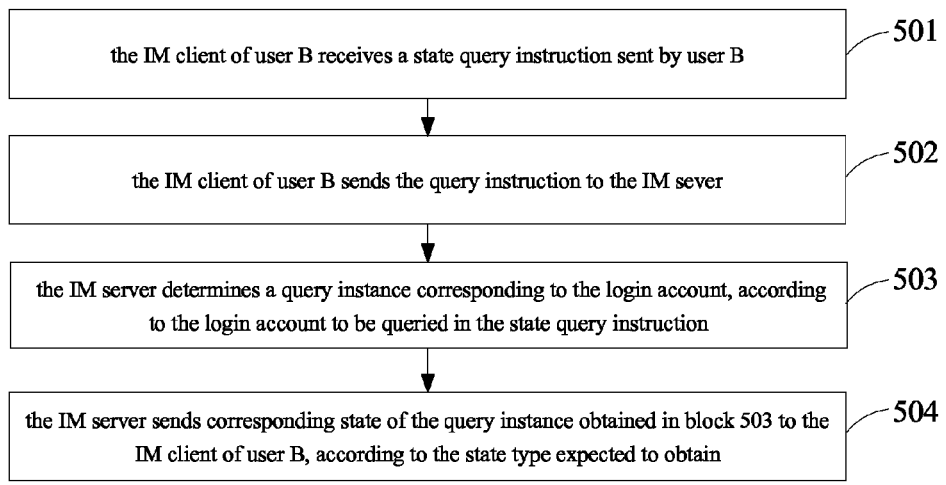
FIG. 5 is a flowchart illustrating an IM method in accordance with the fifth embodiment.

Various embodiments provide a method for processing IM messages. The method provided by the embodiment is established on the basis that, an IM client of a terminal device has successfully logged in an IM server with the method provided by the second embodiment, current or the last active point has been successfully obtained with the method provided by the fourth embodiment. The method provided by the embodiment mainly focuses on setting and displaying state of each IM client, when one login account logging in simultaneously with IM clients of multiple types of terminal devices. With reference to FIG. 5, supposing users A and B are buddies, user A currently uses various terminals to log in multiple instances simultaneously, user B currently logs in a single instance, the method includes the following:

501: an IM client of user B receives a state query instruction sent by user B. The state query instruction at least includes login account and state type, both to be queried by user B. The state type may be classified into the following categories.

(1) Physical state refers to terminal nature of a login instance, such as PC, mobile phone, web, and so on, which may be configured to identify communication capabilities of a terminal.

(2) Basic state may include online, leave, busy, stealthy, offline, self defined state, and so on.

(3) Abundant state may include music to which I am listening, game I am playing, and so on.

502: the IM client of user B may send the query instruction to the IM server. Since each kind of state type may own its identifier, when user B sending an instruction to query state of user A to the IM client, the IM client of user B may obtain which state type of user A expecting to query by user B. The IM client of user B may encode login account thereof, state type expected to query and the state query instruction all together, and send to the IM server.

503: the IM server may determine the query instance corresponding to the login account, according to the login account to be queried in the state query instruction. To determine the query instance corresponding to the login account is relevant with user setting of the login account. Suppose user A sets to update state of all the instances synchronously, the query instance corresponding to the account may be any login instance of user A. Suppose user A sets to maintain respective state of each instance, the query instance corresponding to the account may be current active point (or the last active point) of user A.

504: the IM server sends corresponding state of the query instance obtained in block 503 to the IM client of user B, according to the state type expected to query.

Specifically speaking, when user B expects to query the physical state of user A, (1) the IM client of user B receives an instruction for querying the physical state of user A from user B;

(2) the IM client of user B sends the instruction to the IM server;

(3) the IM server traverses online state record of all the login instances of user A, returns the physical state of current active point (the last active point, when there is no current active point) to the client of user B;

(4) the IM client of user B displays the received physical state of current active point (or the last active point) of user A for user B.

Furthermore, when detecting the active point of user A changes (e.g., user A previously performed operations to PC client, now switches to perform operations to a mobile phone terminal), the IM server may inform all the instances of user B the physical state of current active point of user A. Specifically, when user B expects to query the basic state of user A, (1) the IM client of user B receives an instruction for querying the basic state of user A from user B;

(2) the IM client of user B sends the instruction to the IM server;

(3) the IM server traverses the online state record of all the login instances of user A, and returns the basic state of current active point (the last active point, when there is no current active point) to the client of user B.

It should be noted that, when user A sets to maintain the basic state of each instance synchronously and consistently immediately, since the state of each instance of user A is always consistent with each other, the IM server may not traverse all the login instances of user A. Instead, the IM server may directly return the basic state of any login instance of user A to the client of user B. For example, when user A modifies the state of the first instance as "leave", the state of the second instance of user A may be synchronously modified as "leave", thus the IM server may directly return the state of the first or second instance to the client of user B.

(4) the IM client of user B displays the received basic state of current active point (or the last active point, or any instance) of user A for user B.

For example, when current basic state of the first instance of user A is "leave", the state of the second instance newly logged in may be set as "stealthy". Since the second instance is current active point of user A, the basic state of user A seen by his/her buddy user B is "stealthy".

When user A modifies the basic state of a certain login instance, or logs in a new instance with a basic state, if user A sets to maintain the basic state of each instance synchronously and consistently immediately, the IM server may update the basic state of current instance, besides, the IM server may also update the basic state of the remaining instances of user A as the same value, and inform the client of user B about the modified state.

If user A sets the basic state of each instance to maintain respective state of each instance, the IM server may update the basic state of current instance, set the current instance as current active point, and inform the client of user B the basic state, in which user B is the buddy of user A.

Specifically speaking, when user B expects to query the abundant state of user A, (1) the IM client of user B receives an instruction indicating to display the abundant state of user A from user B;

(2) the IM client of user B sends the instruction to the IM server;

(3) the IM server traverses the online state record of all the login instances of user A, and returns the abundant state of current active point (the last active point, when there is no current active point) to the client of user B;

(4) the IM client of user B displays the received abundant state of current active point (or the last active point) of user A for user B.

Furthermore, when detecting user A modifies the abundant state of a certain instance, the IM server may update the abundant state of current instance, set current instance as current active point, and inform the client of user B about the abundant state, in which user B is the buddy of user A. For example, when user A first listens to music with a PC client (the first instance), the abundant state of user A displayed for user B at this time is "listening to music". And then, user A switches to a mobile phone client (the second instance) to start to play a game, the current active point of user A at this time becomes the second instance. Thus, the abundant state of user A displayed for user B is "playing a game".

In the embodiment of the invention, the IM client may add the login account, the state of which is expected to query, and state type to be queried, to the state query request to send to the IM sever. The IM server may obtain all the login instances of the login account according to the login account, obtain query instance from the login instances according to user settings, and return state of corresponding type of the query instance to the IM client. Thus, state processing under the circumstances that multiple terminals logged in with a same login account may be effectively achieved.

Various embodiments provide an IM method. The method provided by the embodiment is established on the basis that, an IM client of a terminal device has successfully logged in an IM server with the method provided by the second embodiment, and current active point or the last active point has been successfully obtained with the method provided by the fourth embodiment. The method provided by the embodiment mainly focuses on how to process IM messages by each IM client, when IM clients of multiple types of terminal devices are logging in with one login account simultaneously.

Figure 6:
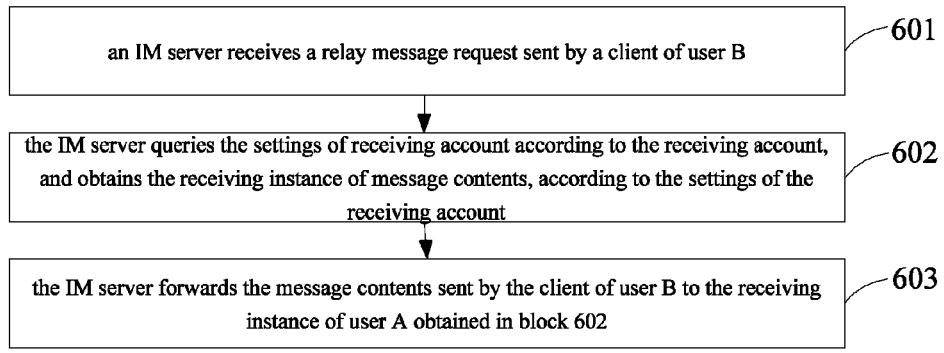
FIG. 6 is a flowchart illustrating an IM method in accordance with the sixth embodiment.

With reference to FIG. 6, supposing users A and B are IM buddies, user A currently employs multiple terminals to log in multiple instances, user B currently logs in a single instance (or user B logs in multiple instances), the method includes the following:

601: an IM server receives a relay message request sent by client of user B. The relay message request at least carries message contents to be sent by user B, and receiving account of the message (take user A as an example).

602: the IM server may query settings of the receiving account, according to the receiving account of the message carried in the relay message request, and obtain receiving instance of the message contents, according to settings of the receiving account.

When the settings of the receiving account (user A) are to receive the message contents of user B simultaneously by each instance, the receiving instance of the message contents may be all the login instances of user A.

When the settings of the receiving account (user A) are to receive the message contents of user B by current active point (or the last active point), the receiving instance of the message contents is current active point (or the last active point) of user A.

Furthermore, the IM server may store the received message contents. For example, the IM server may store the received message contents in respective message queue of users A and B.

603: the IM server may forward the message contents sent by the client of user B to the receiving instance of user A obtained in block 602.

It should be noted that, processing IM messages is the core function of IM software. The IM message mainly includes the following categories:

basic message, such as text chat, webpage link, buddy request, etc;

abundant message, such as screenshots, picture, jitter window, expression, etc;

transmission message, such as voice, video, transmit a file, etc; and group message, such as a message broadcasted in a group.

When user A replies a message to user B with instance N, the IM server may obtain the receiving instance of user B according to the settings of user B, and forward the reply message of user A to the receiving instance of user B. Meanwhile, when user A sets that each instance receives the message contents from user B simultaneously, the server may also send a duplicate of the reply message to other login instances of user A expect for instance N. With reference to the transmission message, it should be noted that, after the server sends a duplicate of the reply message to other login instances of user A expect for instance N, the other login instances may automatically cancel the prompt of transmission message.

In various embodiments, the receiving instance of multiple login instances of one login account may be obtained by the IM server, according to the user settings. Meanwhile the received message may be forwarded to the receiving instance. Subsequently, multiple login instances of one login account may simultaneously receive a message sent by a contact or a group. Thus, diversified usage requirements of a user may be greatly satisfied, multipoint receiving of a message may be effectively achieved, the integrity of message at different terminals may be guaranteed, usage experience of a user may be greatly facilitated, and ease of use of IM software may be provided.

Various embodiments provide an IM method. The method provided by the embodiment is established on the basis that, an IM client of a terminal device has successfully logged in an IM server with the method provided by the second embodiment, and current active point or the last active point has been successfully obtained with the method provided by the fourth embodiment. The method provided by the embodiment mainly focuses on how to perform Peer to Peer (P2P) communications between each IM client of one login account and an IM client of another login account, when multiple IM clients of various kinds of terminal devices logging in simultaneously with one login account.

It should be noted that, when the communication mode between IM clients is the P2P mode, in one implementation mode, when each IM client has logged in successfully, the IM server may issue instance information of other login IM clients to the IM client, and send the instance information of the IM client to other login IM client. In the instance information, current active point or the last active point for one login account may be identified. In the other implementation mode, an IM client in the communication may initiatively send a request to the IM sever for obtaining/updating instance information. After receiving the request, the IM server may send the instance information of other login IM clients to the IM client.

When detecting the instance information of a login IM client changes, the IM server may send the updated instance information to the IM client. Alternatively, the IM server may send the updated instance information to the IM client, according to a preset period.

Figure 7:
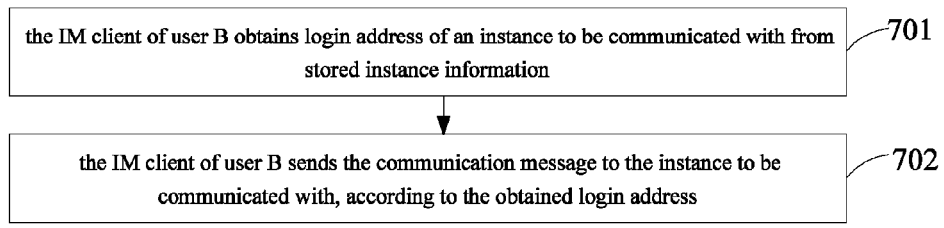
FIG. 7 is a flowchart illustrating an IM method in accordance with the seventh embodiment.

With reference to FIG. 7, suppose that user A (the login account of which is 7895462) and user B are IM buddies, user A currently employs multiple terminals to log in multiple instances simultaneously, user B currently logs in a single instance (or user B currently logs in multiple instances), the method includes the following:

701, the IM client of user B may obtain login address of instance to be communicated with in the stored instance information. The instance information stored in the IM client of user B may be as shown in Table 6.

TABLE 6

| Login account | Terminal type of login instance | Login time | Login address | Allocated instance number | Current/last active point |
|---|---|---|---|---|---|
| 7895462 | Mobile phone | 17:00, September, 2 | 192.168.000.0 | 7895462-MP-A | |
| | Mobile phone | 18:38, September, 2 | 192.168.000.5 | 7895462-MP-B | |
| | Computer | 15:05, September, 2 | 192.168.102.2 | 7895462-PC-A | |
| | TV | 19:03, September, 2 | 192.102.1.158 | 7895462-TV-A | * |
| 5679512 | Web | 18:55, September, 2 | 192.116.8.125 | 5679512-WB-A | * |

Specifically speaking, the IM client of user B displays the stored instance information for user B, and user B selects an instance to perform the P2P communication from the stored instance information. For example, when expecting to perform the P2P communication with user A, the login account of which is 7895462, user B may select to communicate with user A's current active point/last active point, or select to communicate with all the instances of user A. The IM client of user B may obtain the login address of the instance to be communicated with, according to the selection of user B.

702: the IM client of user B may send a message to the instance to be communicated with, according to the obtained login address. The IM client of user B may send the message with some modes, such as cabled, wireless.

In various embodiments, the IM server may issue the instance information of login instance to each IM client successfully logged in, and an IM client may perform P2P communications with other clients according to the login address in the instance information. Subsequently, the P2P communications between multiple login instances of one login account and login instances of other login account may be achieved. Thus, diversified usage requirements of a user may be greatly satisfied, usage experience of a user may be facilitated, and ease of use of IM software may be provided.

Figure 8:
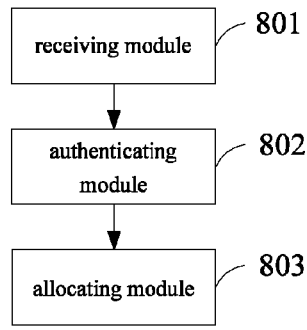
FIG. 8 is a schematic diagram illustrating structure of a server in accordance with the eighth embodiment.

With reference to FIG. 8, various embodiments provide a server. The specific work principle may refer to the methods provided by the first to seventh embodiment. The server includes:

a receiving module 801, configured to receive instance login information sent by an IM client, in which the instance login information at least includes login information of a user of the IM client and instance information of a terminal located by the IM client;

an authenticating module 802, configured to authenticate identity of the user of the IM client, according to the login information in the instance login information;

an allocating module 803, configured to allocate an instance number for the IM client, according to the instance information in the instance login information, when the authentication performed by the authenticating module 802 is passed. The instance number is configured to uniquely identify the IM client.

The server also includes:

a verifying module 804, configured to verify login right of the terminal located by the IM client, when the authentication performed by the authenticating module 802 is passed.

When the verification performed by the verifying module 804 is successful, login of the user of the IM client is allowed. When the verification performed by the verifying module 804 is failed, a login failure message is sent to the IM client. Furthermore, the server still includes an instance query module 805.

The instance query module 805 includes:

a first receiving unit, configured to receive an instance query request sent by the IM client. The instance query request carries the login account of the user of the IM client;

a first obtaining unit, configured to obtain all the instances, which have successfully logged in with the login account, according to the login account in the instance query request; and a first sending unit, configured to send all the instances to the IM client.

Furthermore, the server still includes a force quit module 806.

The force quit module 806 includes:

a second receiving unit, configured to receive a force quit request sent by the IM client, in which the force quit request carries the login account of the user of the IM client, and instance number of an instance to be forced to quit, which is selected by the user;

a second obtaining unit, configured to obtain the instance to be forced to quit, according to the login account and instance number; and a force quit unit, configured to quit the login of the instance to be forced to quit.

Furthermore, the server still includes an active point determining module 807.

The active point determining module 807 includes:

a third receiving unit, configured to receive reported user activity information sent by multiple IM clients of one login account, the reported user activity information carries the operation type and operation time of user operation received by each IM client;

a third obtaining unit, configured to obtain the operation type and operation time sent by each IM client, to obtain total activity score of each IM client; and an identifying unit, configured to identify an IM client with the highest total activity score as current active point, when the total activity score of each IM client obtained by the third obtaining unit is not equal;

when the total activity score of each IM client obtained by the third obtaining unit is equal or is 0, the identity unit is further configured to identify an IM client with latest operation time as the last active point.

Furthermore, the server still includes a state query module 808.

The state query module 808 includes:

a fourth receiving unit, configured to receive a state query request sent by the IM client, in which the state query request carries the login account of a user to be queried and state type expected to obtain;

a fourth obtaining unit, configured to obtain the login instances of the login account, according to the login account;

a determining unit, configured to determine a query instance in all the login instances, according to the user settings of the login account; and a fourth sending unit, configured to send corresponding state of the query instance to the IM client, according to the state type.

Specifically, the determining unit is configured to:

when the user settings of the login account are to maintain respective state of each instance, determine the current active point or the last active point of the login instance as the query instance;

when the user settings of the login account are to synchronously update state of all the instances, determine any instance of the login instances as the query instance.

Furthermore, the server still includes a relay message module 809.

The relay message module 809 includes:

a fifth receiving unit, configured to receive a relay message request sent by the IM client, in which the relay message request carries the message contents and login account of a user receiving the message;

a fifth obtaining unit, configured to obtain all the login instances of the login account, according to the login account of the user receiving the message;

a receiving instance obtaining unit, configured to obtain a receiving instance of the message from all the instances, according to a preset mode; and a fifth sending unit, configured to send the message contents to the receiving instance.

Specifically, the receiving instance obtaining unit is configured to:

take current active point or the last active point of all the login instances corresponding to the login account, as the receiving instance of the obtained message;

or take all the login instances corresponding to the login account as the receiving instance of the obtained message.

Various embodiments provide a server. When an IM client is logging in, the instance information of a terminal located by the IM client may be added to the login information of the user, to form the instance login information to be sent to the server. The server may authenticate the user identity according to the login information. When the authentication is passed, the server may allocate an instance number for the IM client according to the instance information. The instance number may uniquely identify the IM client. Subsequently, a user may be enabled to log in an IM client with a mobile phone, or with the web mode, still or with the PC mode at the same time. Thus, multiple aspects of usage requirements of a user may be satisfied, usage requirements under multiple scenes of a user may be greatly facilitated, and the IM client may be conveniently used at different locations. Meanwhile, multipoint receiving of message may be effectively achieved, integrity of message at different terminals may be guaranteed, usage experience of a user may be greatly facilitated, and ease of use of IM software may be improved.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An Instant Messaging (IM) method, comprising:
receiving instance login information sent by an IM client, wherein the instance login information at least comprises login information of a user of the IM client and instance information of a terminal located by the IM client;

authenticating identity of the user of the IM client, according to the login information in the instance login information;

when the authenticating is passed, allocating an instance number for the IM client, according to the instance information in the instance login information, wherein the instance number is configured to uniquely identify the IM client;

wherein the method further comprises:

receiving reported user activity information sent by multiple IM clients of one login account, wherein the reported user activity information carries operation type and operation time of user operation received by each IM client;

obtaining total activity score of each IM client, according to the operation type and operation time sent by each IM client;

when the total activity score of each IM client is not equal, identifying an IM client with the highest total activity score as the current active point;

when the total activity score of each IM client is equal or 0, identifying an IM client with the latest operation time as the last active point.

2. The method according to claim 1, further comprising:
receiving a state query request sent by the IM client, wherein the state query request carries a login account of a user to be queried and state type expected to obtain;

obtaining login instances of the login account, according to the login account;

determining a query instance in all the login instances, according to user settings of the login account; and sending corresponding state of the query instance to the IM client, according to the state type.

3. The method according to claim 2, wherein determining the query instance in all the login instances according to the user settings of the login account comprises:

when the user settings of the login account are to maintain respective state of each instance, determining the current active point or the last active point of the login instances as the query instance;

when the user settings of the login account are to synchronously update state of each instance, determining any instance in all the login instances as the query instance.

4. The method according to claim 1, further comprising:
receiving a relay message request sent by the IM client, wherein the relay message request carries message contents and a login account of a user receiving the message;

obtaining all the login instances of the login account, according to the login account of the user receiving the message;

obtaining a receiving instance of the message from all the instances, according to a preset mode; and sending the message contents to the receiving instance.

5. The method according to claim 4, wherein obtaining the receiving instance of the message from all the instances according to the preset mode comprises:

taking the current active point or the last active point of all the login instances of the login account as the receiving instance of the obtained message;

or taking all the login instances of the login account as the receiving instance of the obtained message.

6. A server, comprising:
a receiving module, configured to receive instance login information sent by an Instant Messaging (IM) client, wherein the instance login information at least comprises login information of a user of the IM client and instance information of a terminal located by the IM client;
an authenticating module, configured to authenticate identity of the user of the IM client, according to the login information in the instance login information; and
an allocating module, configured to allocate an instance number for the IM client according to the instance information in the instance login information, when the authenticating performed by the authenticating module is passed, wherein the instance number is configured to uniquely identify the IM client;
wherein the server further comprises an active point determining module, and the active point determining module comprises:
a third receiving unit, configured to receive reported user activity information sent by multiple IM clients of one login account, wherein the reported user activity information carries operation type and operation time of user operation received by each IM client;
a third obtaining unit, configured to obtain total activity score of each IM client, according to the operation type and operation time sent by each IM client; and
an identifying unit, configured to identify an IM client with the highest total activity score as current active point, when the total activity score of each IM client obtained by the third obtaining unit is not equal, and to identify an IM client with latest operation time as the last active point, when the total activity score of each IM client obtained by the third obtaining module is equal or 0.

7. The server according to claim 6, further comprising a state query module, wherein the state query module comprises:
a fourth receiving unit, configured to receive a state query request sent by the IM client, wherein the state query request carries a login account of a user to be queried and state type expected to obtain, wherein the state type comprises physical state, basic state and abundant state;
a fourth obtaining unit, configured to obtain all the login instances of the login account according to the login account;
a determining unit, configured to determine a query instance in all the login instances, according to user settings of the login account; and
a fourth sending unit, configured to send corresponding state of the query instance to the IM client, according to the state type.

8. The server according to claim 7, wherein the determining unit is configured to:
determine the current active point or the last active point of the login instances as the query instance, when the user settings of the login account are to maintain respective state of each instance; and
determine any instance in the login instances as the query instance, when the user settings of the login account are to synchronously update state of each instance.

9. The server according to claim 6, further comprising a relay message module, wherein the relay message module comprises:
a fifth receiving unit, configured to receive a relay message request sent by the IM client, wherein the relay message request carries message contents and login account of a user receiving the message;
a fifth obtaining unit, configured to obtain all the login instances of the login account, according to the login account of the user receiving the message;
a receiving instance obtaining unit, configured to obtain a receiving instance of the message from all the instances, according to a preset mode; and
a fifth sending unit, configured to send the message contents to the receiving instance.

10. The server according to claim 9, wherein the receiving instance obtaining unit is configured to:
take the current active point or the last active point of all the login instances of the login account as the receiving instance of obtained message;
or
take all the login instances of the login account as the receiving instance of the obtained message.

11. The server according to claim 6, further comprising:
a verifying module, configured to verify login right of the terminal located by the IM client, when the authenticating performed by the authenticating module is passed;
the verifying module is further configured to allow login of the user of the IM client, when the verifying is successful; and
send a login failure message to the IM client, when the verifying is not successful.

12. The server according to claim 6, further comprising an instance query module, wherein the instance query module comprises:
a first receiving unit, configured to receive an instance query request sent by the IM client, wherein the instance query request carries login account of the user of the IM client;
a first obtaining unit, configured to obtain all the instances successfully logged in with the login account, according to the login account in the instance query request; and
a first sending unit, configured to send identifiers of all the instances to the IM client.

13. The server according to claim 12, further comprising a force quit module, wherein the force quit module comprises:
a second receiving unit, configured to receive a force quit request sent by the IM client, wherein the force quit request carries the login account of the user of the IM client, and an instance number of an instance to be forced to quit selected by the user;
a second obtaining unit, configured to obtain the identifier of the instance to be forced to quit, according to the login account and the instance number; and
a force quit unit, configured to quit the login of the instance to be forced to quit.

14. The method according to claim 1, further comprising:
when the authenticating is passed, verifying login right of the terminal located by the IM client, according to the instance information in the instance login information;
when the verifying is successful, allowing login of the user of the IM client;
when the verifying is not successful, sending a login failure message to the IM client.

15. The method according to claim 1, further comprising:
receiving an instance query request sent by the IM client, wherein the instance query request carries login account of the user of the IM client;
obtaining identifiers of all the instances successfully logged in with the login account, according to the login account in the instance query request; and
sending the identifiers of all the instances to the IM client.

16. The method according to claim 15, further comprising:
- receiving a force quit request sent by the IM client, wherein the force quit request carries the login account of the user of the IM client, and an instance number of an instance to be forced to quit selected by the user;
- obtaining the identifier of the instance to be quitted forced to quit, according to the login account and the instance number; and
- quitting login of the instance to be forced to quit.

* * * * *